W. G. HENKLE.
CLEAT FOR TRACTION WHEELS.
APPLICATION FILED AUG. 10, 1918.
1,315,723.
Patented Sept. 9, 1919.
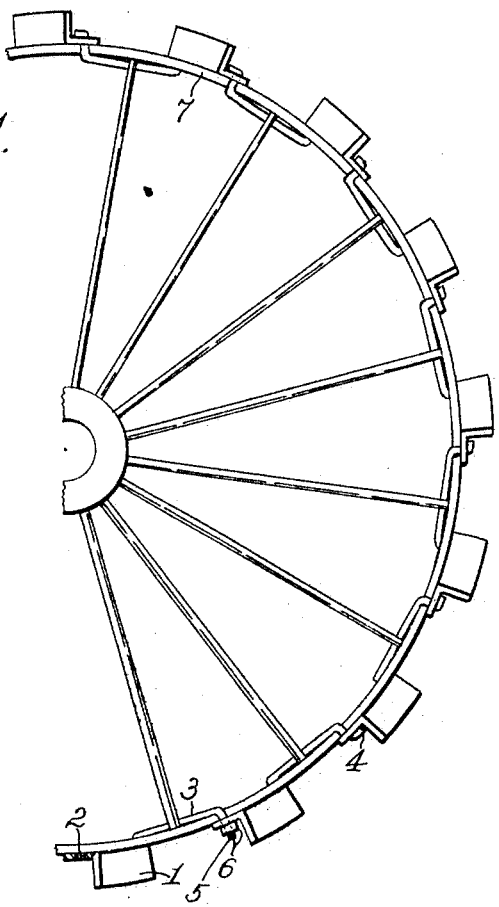
Fig. 1.
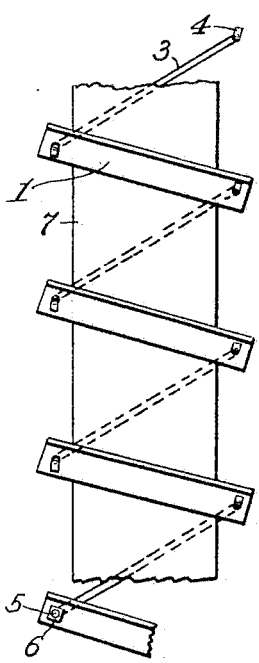
Fig. 2.
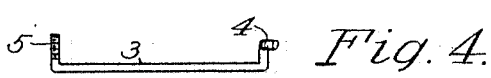
Fig. 3.
Fig. 4.
Inventor,
W. G. Henkle, by
G. C. Kennedy,
Attorney.

UNITED STATES PATENT OFFICE.

WILLARD G. HENKLE, OF GARRISON, IOWA.

CLEAT FOR TRACTION-WHEELS.

1,315,723.      Specification of Letters Patent.      Patented Sept. 9, 1919.

Application filed August 10, 1918. Serial No. 249,254.

*To all whom it may concern:*

Be it known that I, WILLARD G. HENKLE, a citizen of the United States of America, and a resident of Garrison, Benton county, Iowa, have invented certain new and useful Improvements in Cleats for Traction-Wheels, of which the following is a specification.

My invention relates to improvements in cleats for traction wheels, and the object of my improvement is to provide for a traction wheel of a tractor or other vehicle, detachably interlinked engaging-means or transverse cleats for the rim of the wheel, which will be easy to assemble and secure on the wheel and as easily demounted.

This object I have accomplished by the means which are hereinafter described and claimed, and which are illustrated in the accompanying drawings, in which Figure 1 is a side elevation of a traction wheel, part being broken away, equipped with my improved interlinked cleats secured across its rim; Fig. 2 is a development on a plane surface of part of the outer circumferential periphery of the rim of said wheel, showing the arrangement of the cleats across the rim, the positions of the underlaid securing rods being indicated by dotted lines; Fig. 3 is an elevation of one of said rods having both ends offset, and Fig. 4 is an elevation of one rod having one end offset, the other end being bent at a right angle and threaded.

Similar numerals of reference denote corresponding parts throughout the several views.

The wheel 7 shown has a flat tread rim as is usual with traction wheels of tractors and the like. The numeral 1 denotes a plurality of cleats which may be formed of pieces of angle-bar as shown, or in any other form desired, and are positioned around the other circumferential periphery of the rim of the wheel 7 to traverse the rim obliquely and parallel to each other, with their ends projecting beyond opposite edges of said rim, said ends being provided in their projecting portions with orifices 2.

The numeral 3 denotes a like plurality of securing-rods for said cleats, whose opposite ends are offset at 4 to be passed through the orifices 2 of the cleats in assembling the cleats and rods upon the said rim, the offset ends of the rods then engaging the outer faces of the cleats.

The cleats are all fastened removably upon the outer face of said rim by said rods being thus assembled therewith, the rods being passed obliquely, but in a reversed direction, across the inner face of the rim, to have their ends secured in the manner described to the adjacent ends of the alternate cleats, making a zig-zag arrangement of the assembly of both around the wheel. The said connecting-means are alike for all the rods but one, the latter having one end bent at a right angle at 5, as shown in said Fig. 4, and threaded to receive a securing nut 6, the threaded end 5 serving as the final fastening-means for the cleats to connect up the assembly when all the parts have been arranged and connected about the rim. This makes the assemblage of the parts 1 and 3 easy, as also the demounting thereof from the wheel, and as the said parts are all detachably secured together, when demounted, all may be separated, and tied up in a compact bundle for storage until needed again.

The respective parts of said means, as also the securing-means therefor, may be varied without departing from the scope of my invention.

Having described my invention, what I claim as new, and desire to secure by Letters Patent, is:

1. The combination with a traction wheel, of spaced cleats positioned across the outer circumferential periphery of its rim, spaced rods positioned across the inner face of the rim, the ends of the cleats projecting from opposite sides of the rim and provided in their projecting portions with orifices, and the ends of said rods being offset to enter and engage said orifices and the outer faces of the cleats.

2. The combination with a traction wheel, of cleats positioned obliquely across the outer circumferential periphery of its rim, rods positioned across the inner face of the rim, the ends of the cleats projecting from opposite sides of the rim being provided in their projecting portions with orifices, the ends of all said rods but one being offset to enter said orifices and engage the outer faces of said cleats, one end of the excepted rod being bent angularly, passed through the orifice in the abutting end of the adjacent cleat, and removably secured to the outer face of said cleat.

Signed at Garrison, Iowa, this 27th day of July 1918.

WILLARD G. HENKLE.

Copies of this patent may be obtained for five cents each, by addressing the "Commissioner of Patents, Washington, D. C."